United States Patent [19]
de Quervain et al.

[11] 3,895,866
[45] July 22, 1975

[54] INFORMATION-BEARING DEVICES AND PROJECTION DISPLAY SYSTEMS THEREFOR

[75] Inventors: Alfred de Quervain, Zurich; Peter Wild, Wettingen, both of Switzerland

[73] Assignee: Brown, Boveri & Cie AG, Switzerland

[22] Filed: Nov. 29, 1972

[21] Appl. No.: 310,263

[30] Foreign Application Priority Data
Dec. 3, 1971  Switzerland.................... 17591/71

[52] U.S. Cl.................................. 353/30; 353/120
[51] Int. Cl......................................... G03b 21/26
[58] Field of Search.................. 353/120, 122, 30; 350/160 LC

[56] References Cited
UNITED STATES PATENTS

| | | | |
|---|---|---|---|
| 2,042,604 | 6/1936 | King..................... | 353/120 |
| 3,576,364 | 4/1971 | Zanomi................. | 353/122 |
| 3,592,527 | 7/1971 | Conners................ | 350/160 LC |
| 3,718,382 | 2/1973 | Wysocki................ | 350/160 LC |
| 3,722,998 | 3/1973 | Morse................... | 350/160 LC |

*Primary Examiner*—Richard E. Aegerter
*Assistant Examiner*—A. J. Mirabito
*Attorney, Agent, or Firm*—Toren, McGeady and Stanger

[57] ABSTRACT

In the disclosed system a projector optically displays the information content of a transparency. In the transparency a liquid crystalline substance is sandwiched between two transparent plates. Transparent electrodes on the inner faces of the plates are energized to vary the electrical fields to which portions of the substance are subjected. The variation in the fields changes the optical properties of the substance at specific locations. Thus, voltages applied to the electrodes impart optical changes and hence dynamic, i.e. varying, optical in formation to the transparency. Static, i.e. fixed, optical information is added to the varying information by superposing an optical image on the image formed by the substance. This can be done by cementing a film onto the outer surface of the plate or by etching the outer surface of the plate. When the image content of the transparency is projected onto a projection surface it can carry information similar to a display panel. The static information can be formed from spacers mounted between the plates.

31 Claims, 4 Drawing Figures

INFORMATION-BEARING DEVICES AND PROJECTION DISPLAY SYSTEMS THEREFOR

BACKGROUND OF THE INVENTION

This invention relates to information display systems, and particularly to information-bearing devices or information carriers that carry optical information capable of being displayed.

Many technical, monitoring, and control systems, such as industrial process control systems, electrical energy distribution network controls, and military command centers, require large visual displays to present information concerning the systems or processes which are being controlled or monitored. Often, a predominant portion of the displayed information is composed of static information, i.e. constant or invariable information, and a relatively small portion is composed of dynamic information, i.e. variable information.

Such displays frequently take the form of control panels with fixed wiring or computer-controlled chathode-ray viewing devices. Such panels and devices have very significant disadvantages. A control panel does not permit deviation from previously determined operating parameters without rewiring. Moreover, only a limited amount of information or data can be presented over a given surface of the panel. In large plants, the required wall surface is so great that it cannot be properly surveyed by an operator. On the other hand, computer viewing devices exhibit almost unlimited flexibility. However, disregarding the surface limitations of their picture screens, such devices require significant expenditures for electronic components. These expenditures are comparatively inefficient because a substantial portion of the display is used for continuously presenting static information. Also such computer display devices are not easily or economically capable of presenting color information.

Various other types of display systems have been used. One type is disclosed in IEEE Conf. on Display Devices, 1970, 70 C 55, -ED, P. 57 – 67, particularly FIG. 28. This involves a plasma indicating device wherein static information is projected onto the rear of a console screeen which serves as a plasma indicating matrix. However, such a system also represents a number of difficulties and is comparatively complex.

An object of the invention is to avoid the before-mentioned difficulties.

Another object of the invention is to simplify displays and means for producing such displays, while nevertheless increasing their flexibility.

SUMMARY OF THE INVENTION

According to a feature of the invention, these objects are attained in whole or in part, by projecting onto a display area the optical content of an information-bearing device which carries both static and dynamic information.

According to another object of the invention, the information-bearing device includes a first portion that carries static information, i.e. invariable information, and a second portion that carries dynamic information, i.e. variable information.

According to another feature of the invention, the two portions carry their information to form optical shapes which are at least partly superposed.

According to another feature of the invention, at least one of the portions is light permeable.

According to another feature of the invention, both portions are light permeable.

According to another feature of the invention, the information on the second portion is electrically controlled.

According to yet another feature of the invention, the information on the second portion is obtained by supporting an electro-optically-variable liquid crystal substance and by applying indicating voltages to light permeable electrodes that produce potentials across specific sections of the substance so as to control its optical properties.

According to yet a more specific feature of the invention, the electrodes are mounted on light permeable plates which sandwich the substance between them. At the same time, the first portion is applied to one of the plates by cementing a film thereon, by etching, or other means.

These and other features of the invention are pointed out in the claims forming a part of this specification. Other objects and advantages of the invention will become evident from the following detailed description when read in light of the accompanying drawings.

DESCRIPTION OF PREFERRED EMBODIMENTS

Figures 1, 2:
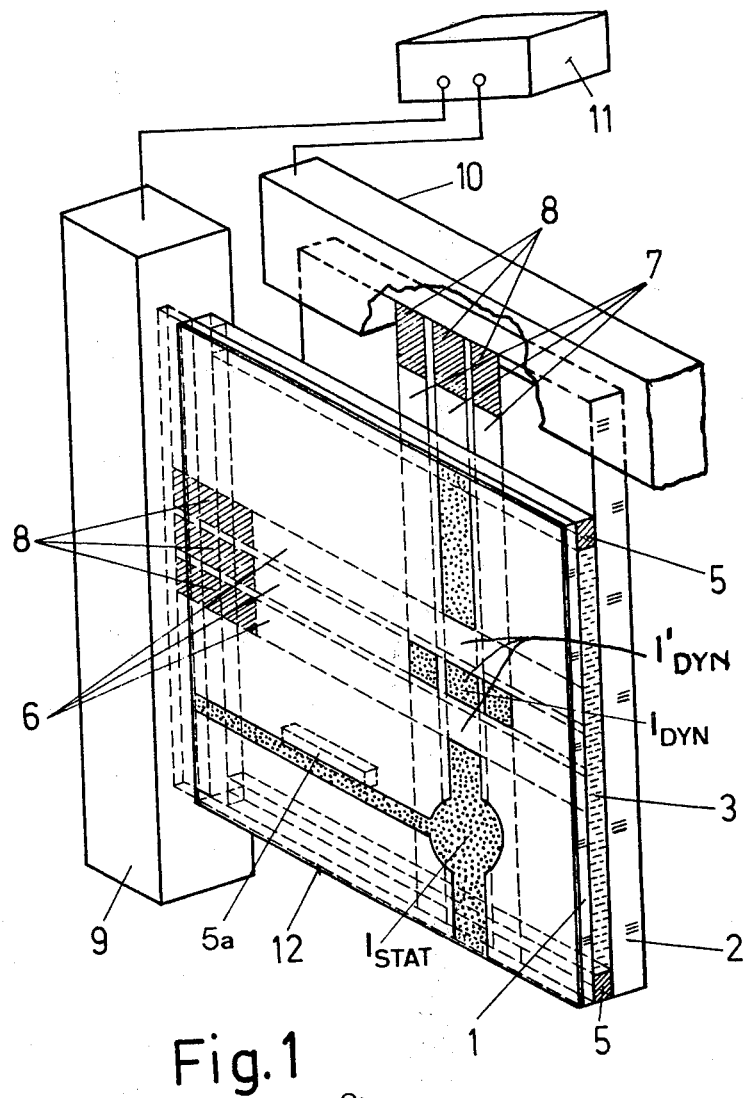
FIG. 1 is a partially schematic, partially perspective drawing illustrating an information-bearing device, with its electrical connections, embodying features of the invention and including a so-called liquid crystal light valve that carries the variable information and a transparency adhesively connected to the light valve and carrying the static information.
FIG. 2 is a schematic diagram illustrating a projection system embodying features of the invention and projecting the information of the information-bearing device of FIG. 1.

In FIG. 1, two parallel glass plates 1 and 2 form part of a diapositive, slide or transparency. The plates sandwich a liquid crystal layer 3, having a thickness of between $5\mu$ and $50\mu$, between them. According to an embodiment of the invention the liquid crystal layer 3 is composed of "Nematic Mixture 5/70" available from the firm Liquid Crystal Ind. According to another embodiment of the invention, the layer 3 is composed of a mixture of Nematic Mixture 5/70 with a cholesterinic liquid crystal. Suitable spacers 5 at the edge or marginal portion between the plates 1 and 2 establish the thickness of the layer 3. The form cholesterinic is used herein interchangeably with cholesteric to mean the same thing.

Transparent strip electrodes 6 are mounted on the inner face of the electrode 1 and extend horizontally as shown in FIG. 1. Transparent strip-shaped electrodes 7 are applied to the inner face of the glass plate 2 and extend vertically as shown in FIG. 1. The term "inner faces" means those faces of the plates 1 and 2 facing the layer 3. According to one embodiment of the invention, the strip electrodes are made of tin dioxide. The electrodes are applied to the plates 1 and 2 according to procedures such as those disclosed in German Auslegeschrift 1,090,830. According to another embodiment of the invention the electrodes are composed of indium-tin-oxide ($In_2O_3$—$SnO_2$) which is deposited on the glass plates 1 and 2. (See RCA Review, volume 32, page 289, 1971).

Metal contact layers 8 extend the electrodes 6 and 7 in respective horizontal and vertical directions so as to form plugs. Suitable jacks 9 and 10 establish contact with the layers 8 and apply operating voltages established by a control apparatus 11.

The thus-far described system continues a so-called light-valve arrangement that corresponds to the one described in British Pat. No. 1,167,486. By applying suitable potentials at the center ones of the electrodes 6, which can be considered the line electrodes and the three electrodes 7, which can be considered the column electrodes, the section identified by $I_{DYN}$ of the layer 3 may have its characteristics optically changed with respect to the remainder of the layer 3. Similarly, applying a suitable potential to the three electrodes 6 and the center one of the electrode 7 optically changes the vertical region $I'_{DYN}$. The electrodes 6 and 7 as well as their extensions, 8, the liquid layer 3, and the portions of the plates 1 and 2 which support the layer, thus form a dynamic information-bearing device which is energized by the apparatus 11 through the plugs 9 and 10. For simplicity, this information-bearing device is referred as a dynamic information carrier.

According to an embodiment of the invention, a film 12 in the form of a transparency acts as a carrier which carries static information $I_{STAT}$, is applied to the outer surface of the plate 1. The emulsion layer of the transparency film 12 faces the plate 1. A cement or glue such as Canada Balsam customarily used in the optical industries for cementing lenses to each other secures the film 12 to the plate 1. According to another embodiment of the invention, rather than applying a film, the plate 1 is provided with an image or pattern that forms the static information $I_{STAT}$ to be represented. According to this embodiment this can be done by using a photographic coating, applying lacquer layers, using photoresist techniques, and similar means. According to yet another embodiment of the invention, the static information is applied to the plate by scratching the desired pattern onto the plate, by etching the plate, by depositing light-absorbing materials such as metals onto the plate, or precipitating these materials onto the plate. In all cases it is necessary that the static information be properly aligned with the light valve arrangement. With films, this may be accomplished by using crosshairs or similar indicating marks. According to an embodiment of the invention, the total transparency is projected onto a screen or similar viewing plane. Under these circumstances it is essential that the crosshairs or other indications be located outside the projection or focusing plane, or region being projected.

For clarity, the thicknesses of the plates and other geometric conditions are exaggerated in FIG. 1. However, it is intended that the distance between the crystal layer 3 and the film 12 be as small as possible so as to obtain a sharp image when the overall transparency is projected. The thickness of the glass plate 1 which is located between the liquid crystal layer 3 and the film 12 should be as small as the mechanical stability of the plate permits. For example, the plate 1 should not be substantially thicker than 1mm. The glass plate 2 may be made thicker than 1 min. The overall transparency or information bearing device is identified in FIG. 1 by the reference character D.

Additional spacer elements 5a inserted in the region of the information surface serve to keep the thickness of the liquid crystal layer substantially uniform in spite of capillary forces. This creates no difficulties in the areas behind the light absorbing regions of the film or carrier 12. According to another embodiment of the invention, glass fibers corresponding in thickness to the spacer 5a and the distance between the plates 1 and 2, form spacers or separating elements between the plates. Such glass fibers are advantageous in that they are not visible behind the transparent regions of the film 1 in the overall transparency. Thus, they do not represent a disturbing influence to an observer. The glass fibers' small thicknesses, which correspond to that of the liquid crystal layer 3, are substantially invisible within the overall image from a practical point of view.

FIG. 2 illustrates a projection system embodying features of the invention which projects the information carrier or transparency D of FIG. 1 onto a display. Here, light from a point source 16 is focused by a reflector 17 and a condenser 18. A heat projecting filter 19 located between the source 16 and the condensor 18 serves to protect heat-sensitive materials, such as the liquid crystal substance, in the transparency or carrier D which is located behind the condenser 18. According to one embodiment of the invention, the heat protecting filter is composed of a dichroic infrared reflecting multilayer filter. The condensed visible light passes through the transparency D. A projecting objective lens 20 focuses the image onto a projection screen 21.

In FIG. 2, spring contacts 8a which contact the layer 8 or form extensions of the layer 8 contact wiring 8b in the plugs 9 and 10. These plugs are connected to the control 11 as shown in FIG. 1. The light passing through the transparency D forms the image of the static information on the screen 21. In addition, as the electrical inputs from the control 11 vary the voltages at the electrodes 6 and 7, dynamic optical information is introduced into the transparency or carrier D. This occurs as the voltages applied to the electrodes 6 and 7 change the optical characteristics of the liquid crystal between the electrodes.

Figure 3:
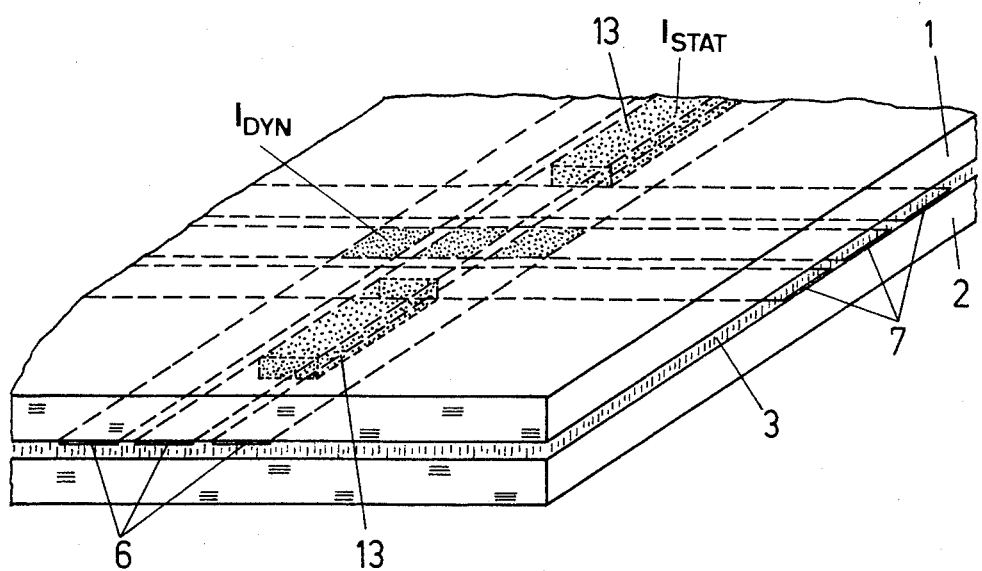
FIG. 3 is a perspective view of a portion of another information-bearing device embodying features of the invention.

Another information bearing device similar to FIG. 1 and embodying features of the invention is shown in FIG. 3. Here specially constructed spacers 13 carry the static information. Otherwise this arrangement corresponds to the previously described light valve arrangement. According to one embodiment of the invention these spacer elements 13 are composed of electrically non-conducting, light absorbing foils, for example, polyester foils having a thickness corresponding to the liquid crystal layer 3. According to another embodiment of the invention a suitable layer of light impermeable lacquer or varnish is used. This lacquer is applied in suitable thicknesses on the glass plate which has already been provided with electrodes.

Another embodiment involves depositing a photolacquer layer of the desired layer thickness on one of the glass plates after the electrodes have been applied. Using semiconductor technology, this photo-lacquer layer is subsequently processed by photographic means and subsequent etching to produce an image that represents the static information. The photo-lacquer layer is substantially light-impermeable in the thickness used. It is electrically non-conductive and chemically resistant relative to the liquid crystal substance. While use of foil is comparatively simple, the use of lacquer offers greater flexibility with respect of the fineness and intricacy of the pattern to be applied.

A third information bearing device embodying features of the invention is shown in FIG. 3. Here, prior to the application of the transparent electrodes on one of the glass plates, this glass plate is provided with a thin, light-impermeable metal layer 14. The metal layer 14 is light-impermeable for at least particular predetermined spectrum ranges of light. This metal layer may for example consist of gold of a thickness of about $1\mu$. Using suitable masks, this metal layer 14 is deposited or applied in a form corresponding to the static information to be represented. According to one example, this is accomplished by vapor deposition. According to another embodiment the metal layer is formed into the desired pattern by etching and the like. An electrically non-conductive and light permeable layer 15, such as a siliconoxide layer of about $1\mu$ thickness, is applied onto the metal layer 14. The light permeable electrodes 6 are applied thereafter. The thus built up glass plate and the other glass plate sandwich the liquid crystal layer 3. Spacer elements 5, or spacer elements 5a, or both, space the plates 1 and 2 from each other When suitable potentials are applied to normally transparent regions of the layer 3, both nematic liquid crystals which produce dynamic scattering, and liquid crystals that exhibit "Texturwechsel-Effekt"(as disclosed, for example, in Appl. Phys lett. 13, 132, 1968) scatter impinging light mainly in the forward direction. In the projector of FIG. 2 a predominant portion of this scatter light is scattered or diffused at the aperture of the projection apparatus. As stated, these regions are transparent when unenergized. Thus, only the pattern of the mask (static information portion) appears in the picture or image plane. Color representations may be realized if the mask permits the passage of light of predetermined wavelength only (colored transparency film 12, colored, light-permeable foil 13 etc.). The term Texturwechsel-Effekt refers to crystal orientation change and diffusion.

Figure 4:
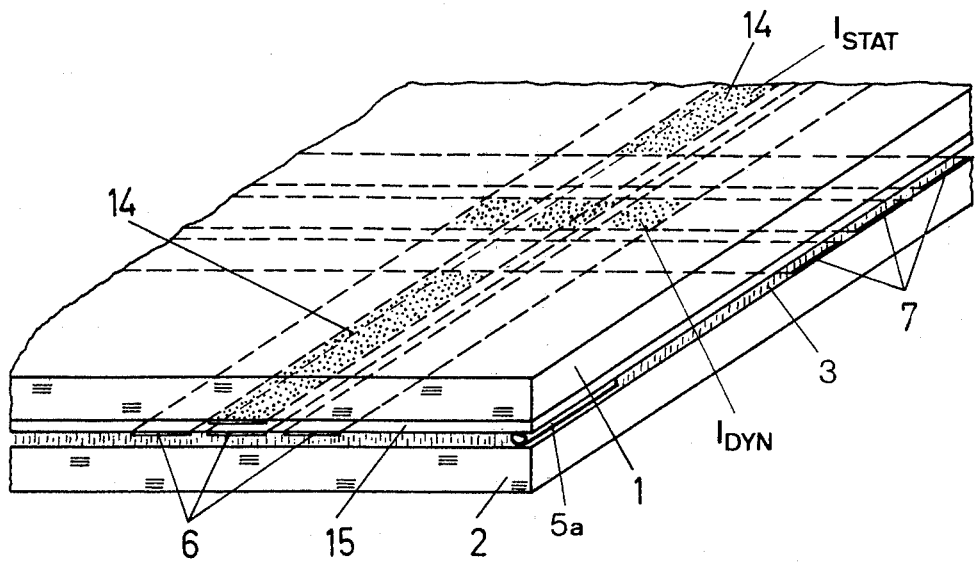
FIG. 4 is a perspective view of a portion of still another information-bearing device embodying features of the invention.

The information-bearing devices of FIGS. 1, 3, and 4, all have their variable information controlled by a matrix arrangement. Other embodiments of the invention involve control arrangements which differ from a matrix. This, of course, depends upon electrode geometry or the symbols to be represented thereby. However, the matrix-like control permits the number of the required electrical connections (such as the metal layers 8 in FIG. 1) to be kept to a minimum. Furthermore, such matrices offer the simplest means for achieving representation of the variable symbols.

Nevertheless, a matrix-like control imposes narrow constraints on the use of dynamic scattering in nematic liquid crystals. If the number of line or column electrodes exceeds a give limit, such as ten, then the obtainable available contrast becomes inadequate. This is so even when contrast improving methods of the type described in Appl. Phys. Lett 19, 335 (1971) are used, due to the voltage ratios or "Tastverhaeltnis" of the control voltage.

According to an embodiment of the invention, complex displays use the so-called Texturwechsel-Effect. This effect involves a kind of storage effect or memory in cholesterinic liquid crystals. In such liquid crystals, Texturwechsel optical changes continue for a relatively long period even after the electrical potential which caused the change, have been removed. Details concerning this effect are disclosed in Appl. Phys. Lett. 13, 132 (1968). A light valve arrangement which makes use of this effect is disclosed in German Offenlegungsschrift 1,814,619.

According to an embodiment of the invention, the disclosed information-bearing devices combine this Texturwechsel change effect with the previously mentioned contrast improvement method. For this purpose the layer 3 is composed of a mixture of 85 to 97% nematic mixture 5/70 and from 15 to 3% cholesteryloleyl-carbonate. Preferably the mixture is 93% nematic mixture 5/70 and 7% cholesteryloleyl-carbonate. According to a preferred embodiment of the invention, the second component (i.e. the carbonate component) of these mixtures is replaced with a 3:2 mixture of the aforementioned cholesteryloleyl-carbonate and cholesterylnonanoate. Such liquid crystal substances exhibit good storage characteristics over a period of several hours. Concerning orientation optical characteristics, the texture or orientataion change effect does not essentially differ from the dynamic light scattering. In both instances, scattering of impinging light exhibits a focal-conical structure or liquid turbulence in the forward direction.

The invention is not limited to the use of liquid crystals whose scattering, diffusion, or diffraction capabilities in the forward direction change in dependence on the controlling voltage. Instead of such liquid crystals, an embodiment of the invention uses liquid crystals in which so-called "Umrichte-Effekte" of the type described in Appl. Phys. Lett. 18, 127, (1971), occur due to the applied voltage or the applied electrical field. In these crystals, the polarization direction changes in dependence on the applied electrical field. Information-bearing devices using such crystals and effects utilize at least one polarizer in the projection system.

The disclosed information-bearing devices may display the required information as a positive or a negative image. If a negative image is displayed, then the dynamic information is, of course, also represented negatively.

According to another embodiment of the invention, parts of the static information carrier, for example the tansparency 12, is used to represent dynamic information. This is valuable when an operational condition at one portion of the plant appears on the indicator surface of the information-bearing devie D in the form of different colors, different symbols, or both. To achieve this, this portion of the plant is allotted to separately controllable regions in the dynamic information carrier. Areas on the static information carrier corresponding to these two regions are also allotted for this portion of the plant. The latter regions are provided with different colors, symbols, or both. One of the two regions of the dynamic information carrier is energized and thus appears as a dark sector on the projection screen, while the other region is illuminated. Deenergization or simultaneous energization of both regions permit representation of additional information.

The term "energization" as used herein refers to the application of voltages to the electrodes and hence the creation of potential fields in portions of the layer 3.

According to another embodiment of the invention, additional information is displayed by rhythmically or synchronously interrupting the energization of the layer 3 in any of the embodiments. The flexibility of the information-bearing device implicit in the number of embodiments does not only extend to the many different forms which the device can take. For example, according to another embodiment of the invention, a number of the information-bearing devices are combined in a magazine, similar to the types of magazines available for transparencies. Thus, any desired information-bearing device can be selected and displayed in the projector. In such a system the plugs 9 and 10, instead of being applied directly to the individual device, are made part of the projector and are arranged to contact the metal layers 8 as the slide is placed into the projector. In that case the plugs 9 and 10 may take the form of simple contacts. The slide enters the light path of the projector and is automatically placed to produce a connection between the metal layers 8 and the contacts of plugs 9 and 10. For this purpose, in the projection system of FIG. 2, the metal layers 8 on the electrodes 6 and 7 are provided with contact springs 8a which connect to the corresponding plug or counter contacts 8b associated with the plugs 9 and 10.

The invention furnishes great flexibility in the display of static and dynamic information. It permits easy exchange of displays. The invention affords simple production, compact structure, and simple handling and servicing.

The devices may carry information concerning an entire plant or only a portion of a plant. By carrying a portion it is possible to increase the detail with which an overall operation is monitored.

What is claimed is:

1. A unitary, optically projectable, composite transparency having an electrically variable, optically readable information content and arranged to be interposed between a projector and a display means, the transparency comprising a first portion bearing static optical information, said first portion including distinct indicia, a second portion bearing dynamic information in intimate contact with the first portion and including a liquid crystalline substance having regions whose optical states can be selectively changed, and control means coupled to the liquid crystalline substance for selectively changing the optical states of the regions.

2. An apparatus as in claim 1, wherein said liquid crystalline substance is a nematic liquid crystal.

3. An apparatus as in claim 1, wherein said liquid crystalline substance is a cholesteric liquid crystal.

4. An apparatus as in claim 1, wherein said liquid crystal substance is a mixture of between 85 and 97% nematic liquid crystal and cholesteric liquid crystal.

5. An apparatus as in claim 1, wherein said second portion further includes a pair of light-permeable plates sandwiching the liquid crystalline substance between them, and a pair of spacers between the plates for spacing the plates a distance of $5\mu$ to $50\mu$ from each other.

6. An apparatus as in claim 1, wherein said second portion includes a plurality of light-permeable electrically conductive electrode means responsive to said control means for establishing and varying potentials within the third and fourth regions.

7. An apparatus as in claim 5, wherein said plates include surfaces facing the liquid crystalline substance, and wherein said second portion includes a plurality of light-permeable electrically conducting electrode means mounted on the surfaces of said plates facing the liquid crystal substance and responsive to said control means for establishing and changing potentials within the third and fourth regions.

8. An apparatus as in claim 6, wherein said electrode means include a plurality of strips forming a matrix.

9. An apparatus as in claim 7, wherein said electrode means include a plurality of elongated electrodes forming a matrix.

10. An apparatus as in claim 5, wherein said spacers include glass fibers having a diameter corresponding to the distance between said plates.

11. An apparatus as in claim 6, wherein said plates each include surfaces facing away from said liquid crystalline substance, said first portion being disposed on one of the surfaces facing away from the liquid crystal substance.

12. An apparatus as in claim 7, wherein spacers are at least partially formed from glass fibers whose diameters correspond to the distance between the plates.

13. An apparatus as in claim 11, wherein said first portion includes a transparent film and an adhesive securing said transparent film to the surface of one of the plates facing away from said substance.

14. An apparatus as in claim 7, wherein said first portion includes a lacquer layer located between the two plates and spacing the plates from each other.

15. An apparatus as in claim 7, wherein said electrode means each include an end contact area near the marginal portions of said plates.

16. An apparatus as in claim 15, further comprising spring contact elements connected to said contact areas.

17. An apparatus as in claim 15, wherein said control means includes electrical means for contacting said contact areas.

18. A unitary, optically projectable, composite transparency having an electrically variable, optically readable information content and arranged to be interposed between a projector and a display means, the transparency comprising, in combination, a first static information bearing portion, and a second dynamic information bearing portion disposed in intimate contact with the first portion, the second portion including a liquid crystalline substance, a pair of light-permeable plates sandwiching the liquid crystalline substance between them, a plurality of light-permeable electrically conductive electrode means mounted on the surfaces of said plates facing the liquid crystalline substance for establishing and changing potentials within the liquid crystalline substance, and a plurality of spacers disposed between the plates for spacing the plates a distance of $5\mu$ to $50\mu$ from each other, the spacers being at least partially formed from glass fibers whose diameters correspond to the distance between the plates, at least a portion of said plurality of spacers also forming a part of said first portion.

19. An apparatus as in claim 8, wherein the proportion of the plurality of said spacers forming a part of said first portion are light-impermeable and electrically non-conductive.

20. An apparatus as in claim 18, wherein said proportion of said spacers which form part of said first portion are foils exhibiting colors and passing light corresponding to the colors which they exhibit, said foils being electrically non-conductive.

21. An apparatus as in claim 20, wherein said foils are of different colors.

22. An apparatus as in claim 1, wherein said distinct indicia are different colors.

23. An apparatus as in claim 1, wherein said distinct indicia are different symbols.

24. An optical projection system for projecting an image on a display, comprising, a unitary optically-projectable composite transparency having an electrically-variable optically-readable information content, said transparency including a first portion bearing static information, said first portion including distinct indicia, a second portion bearing dynamic information in intimate contact with the first portion, the second portion including a liquid crystalline substance having regions whose optical states can be selectively changed, control means coupled to the crystalline substance for selectively changing the optical states of the regions, and means for illuminating the transparency to project an image of the information content thereof.

25. An apparatus as in claim 24, wherein said liquid crystalline substance is a nematic liquid crystal.

26. An apparatus as in claim 24, wherein said liquid crystalline substance is a cholesteric liquid crystal.

27. An apparatus as in claim 24, wherein said second portion further includes a pair of light-permeable plates sandwiching the liquid crystalline substance between them, and a pair of spacers between the plates for spacing the plates a distance of $5\mu$ to $50\mu$ to each other.

28. An apparatus as in claim 27, wherein said plates include surfaces facing the liquid crystalline substance, and wherein said second portion includes light-permeable electrically conducting electrode means mounted on the surfaces of said plates facing the liquid crystal substance for establishing and changing potentials within the liquid crystal substance so as to establish and change particular optical characteristics of said substances.

29. A unitary, optically projectable composite transparency having an electrically variable, optically readable information content and arranged to be interposed between a projector and a display means, the transparency comprising, in combination, a first static information bearing portion, and a second dynamic information bearing portion in intimate contact with the first portion, the second portion including a liquid crystalline substance, a pair of light-permeable plates sandwiching the liquid crystalline substance between them, a plurality of light-permeable electrically conductive electrode means mounted on the surfaces of said plates facing the liquid crystalline substance for establishing and changing potentials within the liquid crystalline substance, and a pair of spacers between the plates for spacing the plates a distance of $5\mu$ to $50\mu$ from each other, the first portion including a metal layer sandwiched between one of the plates and the electrode means on said plate, said metal layer being insulated from said electrode means by an insulating layer, said last-mentioned metal layer being light-impermeable.

30. An apparatus as in claim 29, wherein the metal layer is made of gold about $1\mu$ thick and the insulating layer is a silicon oxide layer approximately $1\mu$ thick.

31. A unitary, optically projectable composite transparency having an electrically variable, optically readable information content and arranged to be interposed between a projector and between a display means, the transparency comprising, in combination, a first static information bearing portion, and a second dynamic information bearing portion in intimate contact with the first portion, the second portion including a liquid crystalline substance, a pair of light-permeable plates sandwiching the liquid crystalline substance between them, a plurality of light-permeable electrically conductive electrode means mounted on the surfaces of said plates facing the liquid crystal substance for establishing and changing potentials within the liquid crystalline substance, and a pair of spacers disposed between the plates for spacing the plates a distance of $5\mu$ to $50\mu$ from each other, the first portion including a thin metal layer located between one of said plates and the electrode means on the one of said plates, an insulating layer separating the metal layer from said electrode means, said metal layer being light-permeable and colored.

* * * * *